(12) United States Patent
Clear (10) Patent No.: US 8,794,381 B2
(45) Date of Patent: Aug. 5, 2014

(54) FITTINGS FOR BUILDERS' TRESTLES

(75) Inventor: Liam Clear, Wembly (GB)

(73) Assignee: Safestand Limited, Wembley (GB)

( * ) Notice: Subject to any disclaimer, the term of this patent is extended or adjusted under 35 U.S.C. 154(b) by 1522 days.

(21) Appl. No.: 11/630,174

(22) PCT Filed: Apr. 28, 2005

(86) PCT No.: PCT/GB2005/001622
§ 371 (c)(1),
(2), (4) Date: Sep. 21, 2007

(87) PCT Pub. No.: WO2005/124057
PCT Pub. Date: Dec. 29, 2005

(65) Prior Publication Data
US 2008/0283336 A1 Nov. 20, 2008

(30) Foreign Application Priority Data

| Jun. 18, 2004 | (GB) | .................................. 0413686.7 |
| Oct. 5, 2004 | (GB) | .................................. 0422072.9 |
| Dec. 23, 2004 | (GB) | .................................. 0428244.8 |

(51) Int. Cl.
*E04G 5/06* (2006.01)
*E06C 7/14* (2006.01)

(52) U.S. Cl.
CPC .... *E06C 7/14* (2013.01); *E04G 5/06* (2013.01)
USPC ..................... 182/178.1; 182/128; 182/178.5; 248/210; 248/211; 248/238; 248/219.2

(58) Field of Classification Search
USPC ............ 182/178.1–178.6, 128; 248/210, 211, 248/238, 219.2
See application file for complete search history.

(56) References Cited

U.S. PATENT DOCUMENTS

| 2,125,830 | A | * | 8/1938 | Uecker et al. .................. 248/235 |
| 2,305,563 | A | * | 12/1942 | Uecker et al. .................... 52/693 |
| 2,593,122 | A | * | 4/1952 | Droeger et al. ............ 182/178.6 |
| 2,818,308 | A | * | 12/1957 | Williams .................... 182/178.6 |
| 2,879,552 | A | * | 3/1959 | Torrance ......................... 52/637 |

(Continued)

FOREIGN PATENT DOCUMENTS

| BE | 784 251 | 6/1972 |
| DE | 1 230 190 | 12/1966 |

(Continued)

OTHER PUBLICATIONS

Layher Product Catalog, p. 13 (Apr. 3, 2001).

*Primary Examiner* — Alvin Chin-Shue
*Assistant Examiner* — Colleen M Chavchavadze (57) ABSTRACT

A bracket (60) for securing a first kickboard (62) transversely of a second kickboard (54) comprises a socket (64) for receiving an end of the first kickboard and a clip (70) for securing the bracket to the second kickboard, the clip comprising a lateral extension (76) aligned with the longitudinal axis of the second kickboard for stabilizing the bracket thereon. Also disclosed are (1) a telescopic rail (46) for use in forming a guard or safety barrier for builders' trestles, staging, scaffolding or the like, comprising inner and outer telescopic parts (80, 82), in which the inner part is prevented from sliding free of the outer part in use; (2) a brace for stabilizing adjacent trestles; (3) a ladder support bracket; (4) removable safety rail components and (5) a longitudinal kickboard bracket attached to a trestle crossmember.

5 Claims, 8 Drawing Sheets

(56) References Cited

U.S. PATENT DOCUMENTS

| | | | | |
|---|---|---|---|---|
| 2,988,181 A | * | 6/1961 | Darrey | 52/646 |
| 3,084,761 A | * | 4/1963 | Robertson | 182/178.6 |
| 3,369,331 A | * | 2/1968 | Deskey et al. | 52/38 |
| 3,392,801 A | * | 7/1968 | Gethmann | 182/178.6 |
| 3,410,995 A | * | 11/1968 | Gray | 52/28 |
| 3,454,131 A | * | 7/1969 | Johnson et al. | 182/115 |
| 3,493,208 A | * | 2/1970 | Masataro | 248/235 |
| 3,533,592 A | * | 10/1970 | Jennings | 249/18 |
| 3,684,057 A | | 8/1972 | Eppinette | |
| 3,684,058 A | * | 8/1972 | Brown | 182/132 |
| 3,850,264 A | * | 11/1974 | Salinas | 182/178.3 |
| 3,972,169 A | | 8/1976 | Sheppard, Jr. | |
| 4,291,784 A | * | 9/1981 | Moses | 182/178.6 |
| 4,372,425 A | * | 2/1983 | Murphy | 182/186.9 |
| 4,821,844 A | * | 4/1989 | Huffman et al. | 182/186.9 |
| 4,830,144 A | * | 5/1989 | Werner | 182/178.5 |
| 5,135,077 A | * | 8/1992 | Shalders | 182/82 |
| 5,385,215 A | * | 1/1995 | Williams et al. | 182/179.1 |
| 6,443,262 B1 | * | 9/2002 | Karanouh | 182/178.1 |
| 7,353,911 B1 | * | 4/2008 | Freeman | 182/129 |

FOREIGN PATENT DOCUMENTS

| | | |
|---|---|---|
| DE | 1 478 031 | 7/1969 |
| DE | 77 05 431 U1 | 6/1977 |
| DE | 78 27 662 U1 | 1/1979 |
| DE | 30 40 707 A1 | 6/1982 |
| DE | 35 04 188 A1 | 8/1986 |
| DE | 90 14 137.7 U1 | 6/1991 |
| DE | 297 00 962 U1 | 9/1997 |
| DE | 197 03 558 A1 | 8/1998 |
| DE | 199 11 503 A1 | 10/1999 |
| DE | 200 05 629 U1 | 8/2000 |
| EP | 0 234 657 A2 | 9/1987 |
| EP | 0 913 541 A1 | 5/1999 |
| EP | 1 094 175 A1 | 4/2001 |
| EP | 1 338 723 A2 | 2/2003 |
| EP | 1 302 609 A1 | 4/2003 |
| FR | 1 229 377 | 9/1960 |
| FR | 2 138 293 | 1/1973 |
| FR | 2 247 912 | 5/1975 |
| FR | 2 495 671 | 6/1982 |
| FR | 2 516 141 | 5/1983 |
| GB | 642367 | 8/1950 |
| GB | 652301 | 4/1951 |
| GB | 681485 | 10/1952 |
| GB | 961392 | 6/1964 |
| GB | 2 329 667 A | 3/1999 |
| GB | 2 346 650 A | 8/2000 |
| GB | 2 364 733 A | 2/2002 |
| GB | 2 377 248 A | 1/2003 |
| WO | WO 2004/109038 A1 | 12/2004 |

* cited by examiner

FITTINGS FOR BUILDERS' TRESTLES

BACKGROUND OF THE INVENTION

This invention relates to trestles ("bandstands") for supporting working platforms used on building sites and the like. Two or more such trestles are usually used together with scaffolding boards supported between them to make up the platform. Such trestles are generally used to support working platforms of relatively low height (e.g. 0.2-3.0 m) as a more convenient alternative to scaffolding. The invention relates more particularly to access and safety features for such trestles and platforms. A system of builders' trestles provided with safety barriers, board end supporting safety brackets, end gates and kickboard brackets is described in UK Patent No. GB2378978.

The trestle shown in GB2378978 comprises a pair of upright supports connected by a crossmember upon which planks or boards can be supported in use to make a platform, one of the upright supports having an integral upward extension above the crossmember, reaching to a height at which one or more generally horizontally extending rails can be attached to form the safety barrier. When the trestles are being used against an existing wall, a single safety barrier at the opposite side of the platform to the wall will be adequate. However, where the wall is absent or incomplete (for example when the trestles are being used to build the wall) safety barriers at either side of the platform may be desirable.

SUMMARY OF THE INVENTION

Accordingly, the present invention provides a builder's trestle providing a safety barrier as described above, in which the crossmember is provided at its end opposite the upward extension with a fitting for receiving the lower end of a removable upright, to which further safety rails can be attached to form a further safety barrier. The fitting may simply be an open upper end of the upright at that end of the crossmember, into which the lower end of the removable upright is telescopingly fitted, the open end preferably extending a little above the crossmember to provide an edge stop for the scaffolding boards used to form the platform.

Alternatively, the fitting may comprise a spigot secured in or formed from the upper end of the upright at that end of the crossmember.

Preferably however, the fitting comprises a tubular socket attached to that end of the crossmember, the upright at that end of the crossmember being attached to the crossmember inboard of the socket. The socket preferably comprises a through-going opening for receiving the lower end of the removable upright. Debris such as mortar droppings therefore will fall through the opening and will not accumulate in and obstruct the socket.

The removable upright and the upward extension may each be provided with fittings for attachment of the safety rails, these fittings being provided at approximately the same height on the removable upright as on the upward extension. Safety rails can therefore also be fitted between the removable upright and upward extension, for example to form safety barriers at the ends of the working platform. The safety rails may be telescopic, allowing them to be secured between upright supports at various different spacings.

The applicants have developed a trestle system in accordance with GB2378978, which is marketed as the SafeStand® 1200 Access System. Although performance of this system is a great improvement on traditional "bandstands", it has been found that a further increase in trestle stability would be desirable, particularly when the trestles are used at or near their maximum height.

Accordingly, in a second aspect, the present invention provides a stabilising brace for fitment between builders' trestles, the brace having at one end a fixed formation engageable with a first trestle at a first angle and being rotatable to a second angle at which the fixed formation locks the brace to the first trestle, the brace having at its other end a movable latch for locking the brace to a second trestle.

Preferably the latch is captive on the brace so that there are no separate parts that could get lost. The latch secures the brace at the second angle to the first trestle, so not only does the latch lock the brace other end to the second trestle, but it also ensures that the fixed formation is locked to the first trestle. This locking arrangement is effective and simple to use, without tools or specialist skills. In the locked position, the brace preferably extends diagonally in a vertical plane between the first and second trestles so as to stabilise them against swaying.

The fixed formation may comprise a first component laterally engageable with the first trestle to provide a pivot point for the brace, and a second component which moves behind a part of the first trestle as the brace is rotated from the first to the second angle, so as to prevent lateral disengagement of the first formation. In one embodiment, the first component comprises a laterally extending pin or spigot engageable in a corresponding hole formed in a part of the first trestle; the second component comprising a claw which extends laterally across the first trestle part as the pin engages in the hole and which engages behind the trestle part to prevent withdrawal of the pin from the hole as the brace is rotated from the first to the second angle. The trestle part in this embodiment is a diagonal strut forming part of the first trestle's pedestal base, but other locations for the hole are also possible, for example in an upright part of the pedestal base.

The movable latch somewhat similarly may comprise a first component laterally engageable with the second trestle, and a second component which is rotatable to engage behind a part of the second trestle so as to prevent lateral disengagement of the first component. In one embodiment the latch first component comprises a lateral pin or spigot, engageable in a corresponding hole formed in the second trestle, for example in a telescopic part of the trestle's upright. This hole may be a hole normally used to lock the telescopic upright at a selected height, or may be specially provided for reception of the brace's lateral pin. The latch second component comprises a rotatable claw. Preferably the rotatable claw is held by gravity in engagement behind the second trestle part, for example resting on the distal end of the pin, which protrudes through the second trestle part. Again, this latching arrangement is robust, reliable and simple to operate, requiring no tools or specialist skills.

Figure 3:
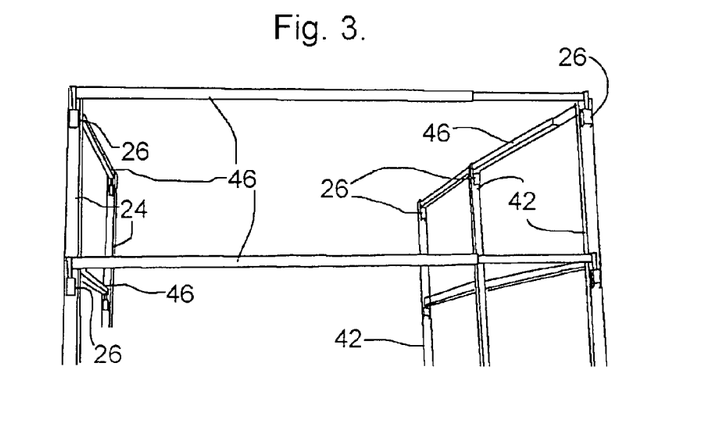
FIG. 3 shows assembled safety barriers referred to above.

A further potential hazard arises from the telescopic safety rails referred to above. In one form, as shown for example in FIG. 3, such a safety rail comprises an inner tubular e.g. square- or rectangular-sectioned part slideable within an outer tubular part of corresponding section. The inner part is freely engageable with/disengageable from the outer part, so that during handling and installation the inner part may accidentally slide out of the outer part and fall from height. JP2003041779 shows telescopic guard rails with tubular inner and outer parts, each of which is provided internally with transversely extending pins. A band of elastic material passes around the pins inside the parts to hold them together.

DE19703558 shows a telescopic scaffolding handrail. A tang or indentation in an outer tubular part engages in a longitudinal depression formed in an inner tubular part so as to prevent relative rotation between these parts and so as to hold the inner part captive within the outer part.

In a third aspect, the present invention provides a telescopic rail for use in forming a guard or safety barrier for builders' trestles, staging, scaffolding or the like, comprising inner and outer telescopic parts, in which the inner part is prevented from sliding free of the outer part in use, characterised in that the inner part comprises a lateral outward projection engageable with the outer part to prevent the two parts from sliding free of one another. The lateral outward projection may comprise an inner end stop on the inner telescopic part and the outer part may comprise lateral inward projection forming a co-operating end stop, e.g. a collar on the outer part. Preferably however, the inner and outer parts are prevented from sliding free of one another by a resiliently loaded latch carried by one part, engageable in a locking formation on the other part. The latch may be a pin and the locking formation a socket or aperture. The resilient loading or bias may be provided by a leaf spring e.g. a bow spring mounted in the inner part. A plurality of locking formations may be provided, for example one at either end of the outer part, whereby the safety rail may be latched in a fully extended and a fully retracted position.

A ladder is usually used to access the platform supported by the trestles. Leaning the ladder against the edge of the platform may be unsafe, as the boards forming the platform are simply rested on upper crossbars of the trestles and can shift under lateral thrust loads. The ladder can also topple sideways unless tied securely to the trestle structure. Furthermore, a large gap must be left in the safety rail, both for the ladder itself and to allow workmen to step off and on the ladder, to and from the platform. This manoeuvre can be difficult, particularly when carrying heavy loads, as access to the platform is in front of and to one side of the ladder. DE4405117 shows a ladder support arm extending transversely from a platform made up of longitudinally extending staging elements. The support arm is attached to the platform by clamping to the staging element forming the nearest edge of the platform.

In a fourth aspect, the present invention addresses the above problems by providing a ladder support bracket comprising a laterally extending arm against which a ladder can be rested in use, characterised in that the bracket comprises a generally vertically extending arm adapted to be secured to an upright support of a builder's trestle or scaffolding. In some embodiments, the generally vertically extending arm may be adapted for engagement over or within the upright support. The generally vertically extending arm can simply be dropped over or into the upright, and a ladder rested against the laterally extending bracket arm. This arm may be arranged to extend parallel to platform supporting cross-members of the builders' trestles or scaffolding, such that the platform lies to one side of the ladder. The gap in any safety rail required for ladder access can thereby be reduced, and stepping onto or off the ladder involves a simple sideways movement.

The generally vertically extending arm may be hollow and fit telescopically over the upright in use. Preferably however, it comprises a downwardly directed spigot which engages within the hollow interior of a tubular upright support. The generally vertically extending arm is preferably provided with means to engage the upright support to prevent rotation of the support bracket around the longitudinal axis of the upright. For example the engagement means and upright may have complementary non-circular (e.g. square or rectangular) profiles.

The laterally extending arm preferably has one end attached to the generally vertically extending arm, and a stop member at its other end. The ladder can then be rested against the laterally extending arm between the vertical arm and the stop, secured against toppling sideways.

To better prevent objects from being accidentally knocked over the edges of the platform supported by the trestles, it is desirable to provide transverse kickboards at the ends of the platform as well as a longitudinal kickboard at the rear edge (opposite the working side). Joist hangers are known, having a pocket for reception of a joist end, and a strap or bracket for securing the pocket to an adjacent wall or stringer. See, for example, GB2354267. Such hangers do not suggest themselves, and are not suitable for, securing transverse kickboards to a longitudinal kickboard on a platform supported by builders' trestles. Either the hanger must be permanently or semi-permanently secured to the longitudinal kickboard or, if left loose, does not form a sufficiently stable support for the transverse kickboard. In particular, the hanger may pivot about the strap or bracket and disengage from the longitudinal kickboard. Thus, if such joist hangers were to be used loose, far from guarding against accidents caused by falling objects, the transverse kickboard itself would become a hazardous unsecured and potentially falling object.

In accordance with a fifth aspect of the present invention there is provided a bracket for securing a first kickboard transversely of a second kickboard, comprising a socket dimensioned for securely receiving an end of the first kickboard and a clip for securing the bracket to the second kickboard, characterised in that the clip comprises a hook part dimensioned for securely suspending the bracket from the top edge of the second kickboard, the clip comprising a lateral extension aligned with the longitudinal axis of the second kickboard for stabilising the bracket thereon. Preferably the lateral extension comprises a pair of projections extending one on either side of the socket. The extensions may lie along the top edge of the second kickboard in use. The socket may comprise a pair of opposed side walls and optionally a bottom wall for engaging the end of the first kickboard. The transverse kickboard bracket is not only useful in conjunction with platforms supported by builders' trestles, but may be used in connection with any kickboards, including those used in staging, scaffolding and the like.

GB2378978 also discloses brackets secured to the upward extension, for holding a kickboard, used to prevent objects from being accidentally pushed over the edge of the working platform. These brackets extend over the top of the board forming the edge of the platform nearest to the upward extension and can interfere with placement of this board. Also, it is sometimes necessary to remove this board whilst the remaining boards are kept in place as the working platform. The presence of the overhanging kickboard brackets makes this very difficult or impossible.

In accordance with a sixth aspect of the present invention there is provided a builder's trestle providing a safety barrier and comprising a pair of upright supports connected by a crossmember upon which planks or boards can be supported in use to make a platform, one of the upright supports having an upward extension above the crossmember, the trestle further comprising a bracket for receiving a kickboard, characterised in that the bracket extends upwardly from the crossmember and is spaced from the upright, so that the kickboard may be received and held between the bracket and the upward extension in use. The platform-forming boards are therefore all inboard of the kickboard bracket and can all be easily removed and/or rearranged without hindrance from the kickboard or its bracket.

The invention and various preferred features and advantages of it are further described below with reference to illustrative embodiments shown in the drawings, in which:

DETAILED DESCRIPTION OF THE INVENTION

Figure 1:
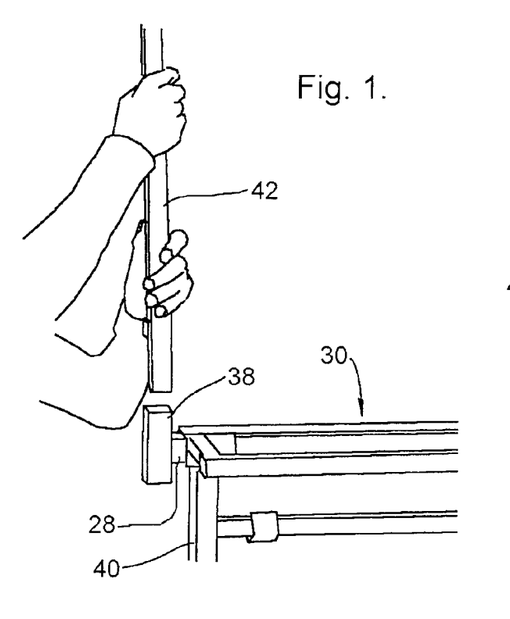
FIG. 1 shows the lower end of a removable upright being offered up for fitment to a trestle.
Figure 2:
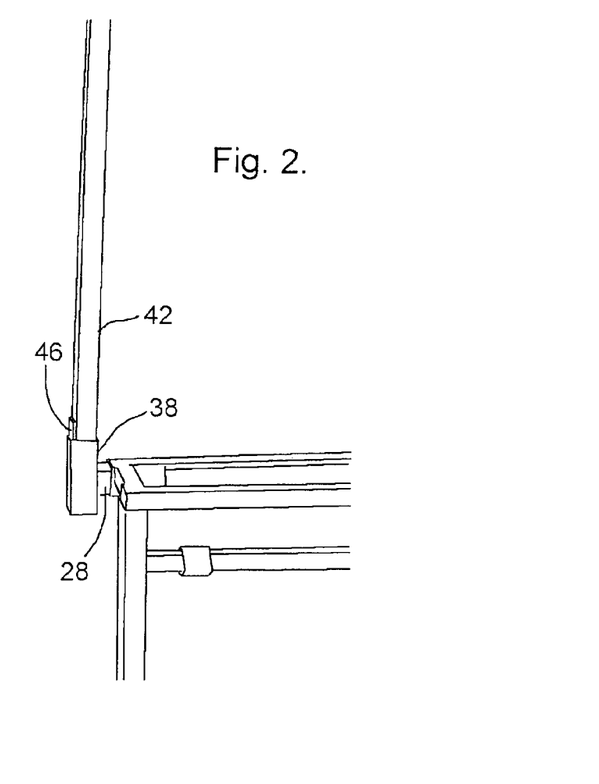
FIG. 2 shows the removable upright lower end received in its socket on the trestle.

FIG. 1 shows a tubular socket 38 welded to the end of the upper crossmember 28 of a trestle 30. The crossmember end extends outwardly beyond an upright support 40. The lower end of a removable upright 42 can be telescopingly received in the socket 38. FIG. 2 shows the removable upright 42 lower end received in the socket 38. A welded-on stop plate 46 prevents the end from passing completely through the socket 38.

At the end of the trestle (not shown in FIG. 2) opposite to the upright support 40 and socket 38, another upright support is provided with an integral upward extension 24 (FIG. 3) reaching above the platform supported by the trestle, to a height suitable for attachment of generally horizontally extending safety rails. Upper ends of the removable uprights 42 are provided with ears 26 for receiving end spigots of the safety rails 46 so as to form a safety barrier at the working side of the platform. Safety rails 46 may also be fastened in the same manner between a removable upright 42 and the fixed upward extension 24 at the other side of the same trestle, to form an end barrier. For this purpose, the ears 26 are fixed to the removable uprights 42 and fixed upward extensions 24 at substantially the same heights above the platform. Safety rails 46 are also secured between the fixed upward extensions 24 to form a safety barrier at the other side of the platform, parallel with and opposite to the working side. The safety rails 46 are preferably telescopic for adjustment to different trestle spacings and widths. They may be removed when no longer needed, for example being removed progressively as a wall is built up in front of the platform. A kickboard may be secured to the removable uprights 42 by suitable brackets (not shown), comprising for example a U-shaped saddle part for reception of the kickboard, and a collar attached to the saddle part, through which the upright 42 is threaded prior to reception in the socket 38.

Figure 4:
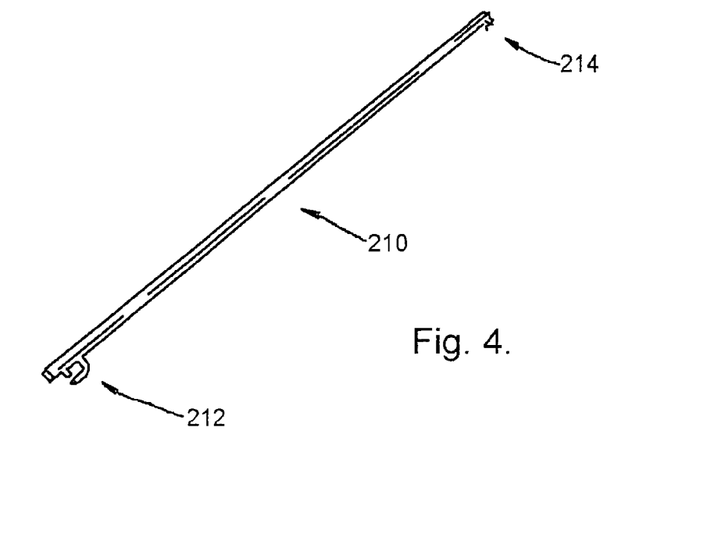
FIG. 4 is a general view of the brace.
Figure 5:
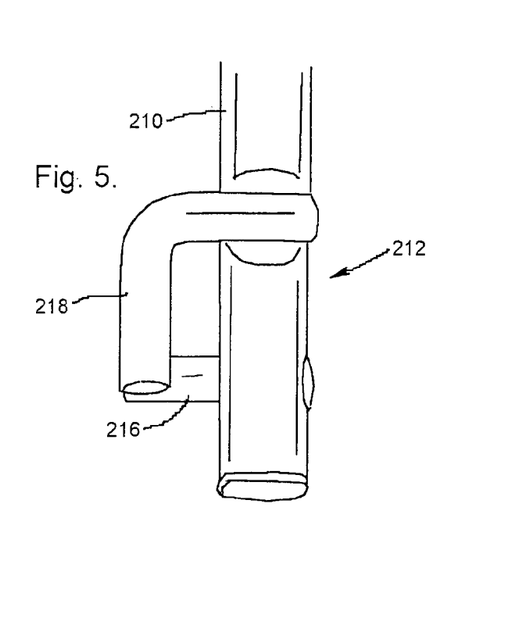
FIG. 5 is a side view the brace fixed formation shown on a larger scale.
Figure 6:
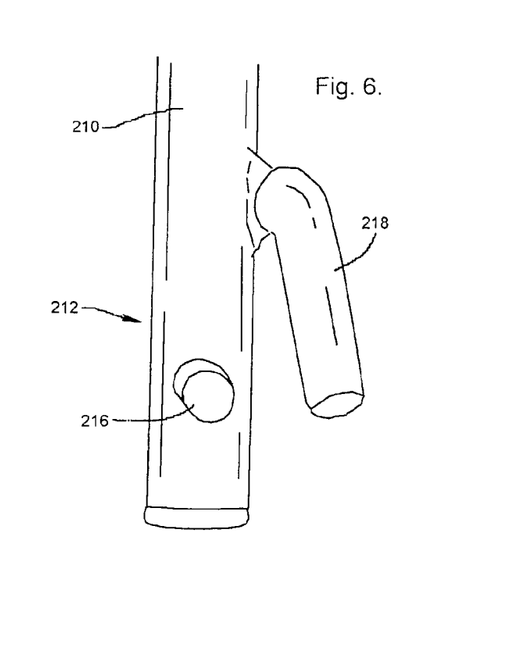
FIG. 6 is a view of the brace fixed formation in the lateral direction, corresponding to FIG. 5.

As a further development of the SafeStand 1200 Access System it has been recognized that stability whilst in use at the upper limits of its height, can be enhanced by the introduction of braces 210 as shown in FIG. 4.

In order to remain sympathetic to the design concept of the SafeStand system the mechanics of the connection of the brace to the trestles have been specifically designed so that there are no free or loose connection parts that can become detached and the method of fixing the brace to the stand remains a non-skilled work activity.

The braces are fitted diagonally between adjacent trestles (see also FIG. 13); one end of the brace having a fixed "pin-and-claw" arrangement 212; the entire brace being offered up and rotated into position to lock this end into place; a pin and rotating claw being used to lock the other end 214 to its trestle.

Figure 9:
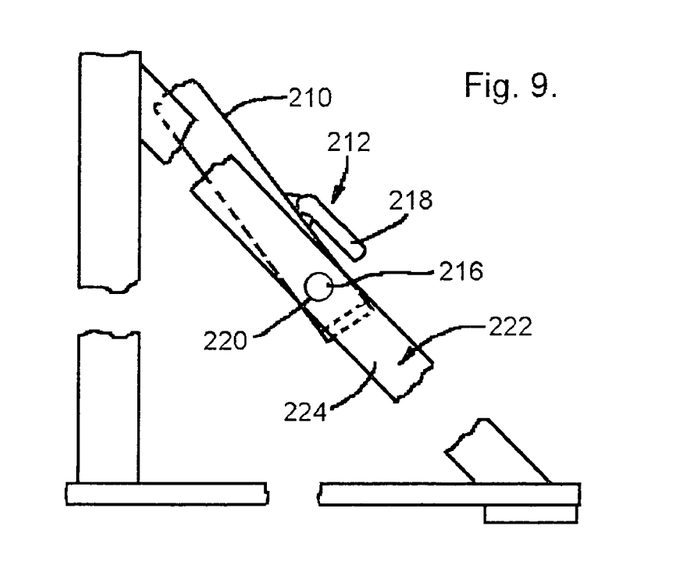
FIG. 9 shows the fixed formation engaged with the first trestle part with the brace at the first angle, with FIG. 10 being a corresponding perspective view with the brace at the second angle.
Figure 10:
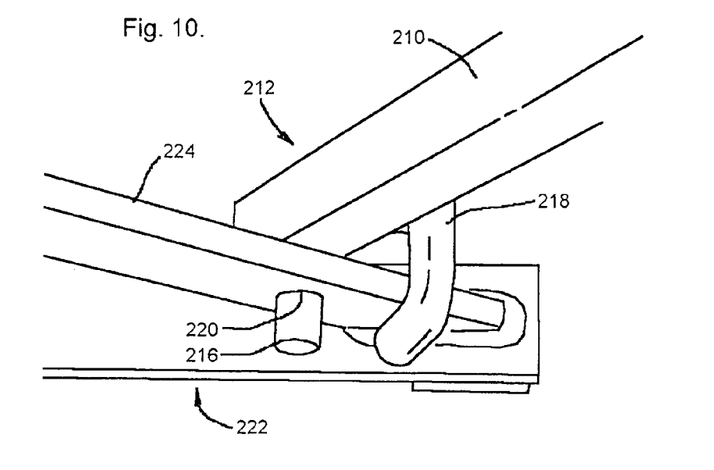

As shown more clearly in FIGS. 5, 6, 9 and 10 the fixed "pin-and-claw" arrangement 212 consists of a pin 216 which fits through a pre-drilled hole 220 in the pedestal base 222 of the trestle, creating a rotating fixing between the brace and the trestle. The claw 218 of the arrangement 212 is specifically designed so as to allow the pin to be inserted in the designated hole 220 in the base 222 of the trestle, only when the brace is inclined at a specific temporary position at a first angle relative to the base 222 as shown in FIG. 9. Once the pin connection is made to the base of the trestle, the brace 210 is rotated such that a pin connection can be made to the adjacent trestle, using the other end 214 of the brace 210 as further described below. In carrying out this rotation action the "claw" 218 engages around and behind the inclined member 224 of the base of the trestle (see FIG. 10) such that once the brace reaches its final (second) angle relative to the trestle base, the "claw" 218 prevents the brace from being accidentally removed, by preventing withdrawal of the pin 216 from the hole 220 whilst the trestle is in use.

Figure 7:
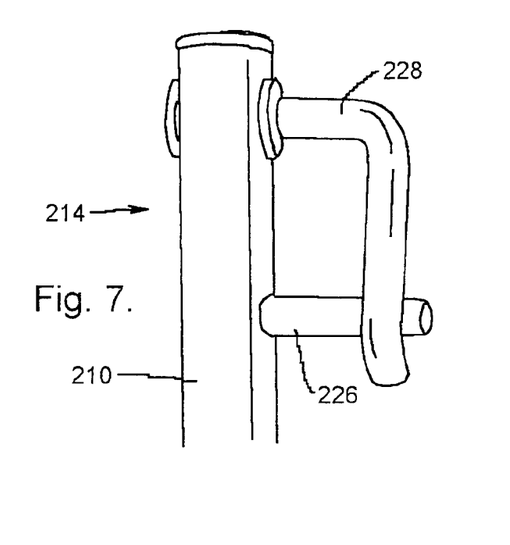
FIGS. 7 and 8 are views of the movable latch, corresponding to FIGS. 5 and 6 respectively.
Figure 8:
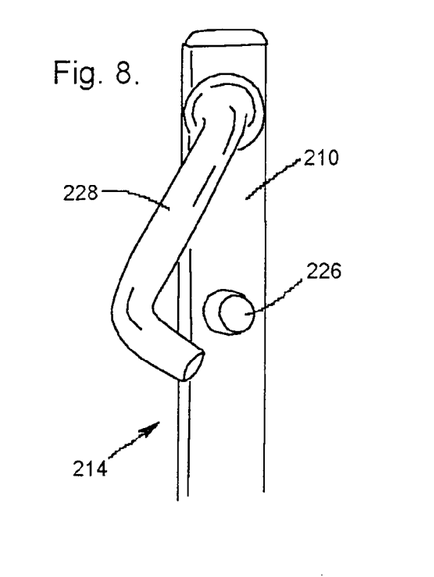
Figure 11:
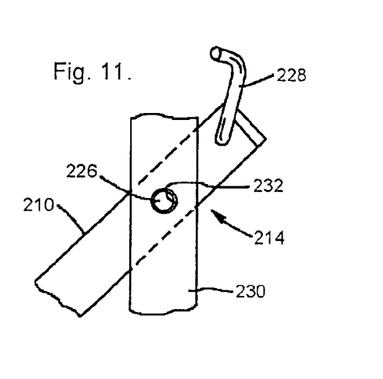
FIG. 11 shows the movable latch partly engaged with the second trestle part.
Figure 12:
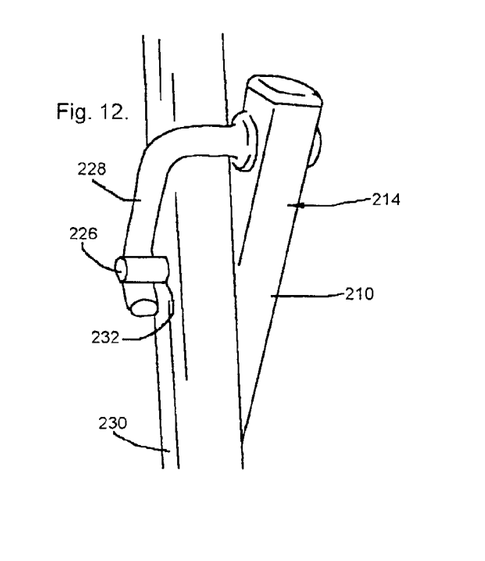
FIG. 12 shows the movable latch fully engaged.

The pin 226 and rotating claw 228 arrangement at the other end 214 of the brace 10 shown in FIGS. 7, 8 and 11 allows a pinned connection to be made to the vertical upright 230 of the trestle through a predrilled locating hole 232. Once the pin 226 is engaged in the hole 232, the rotating claw 228 can be rotated to engage around and behind the upright 230 so as to rest under its own weight against the end of the pin 226 where it protrudes from the hole 232. In this resting position as shown in FIG. 12, the brace cannot be accidentally removed by withdrawal of the pin 226 from the hole 232.

The hole 232 may be the hole at the upper end of the trestle base, through which a locking pin is introduced into a corresponding hole in a telescopic upper part of the trestle, to hold the upper part at a given extension. Thus the pin 226 on the brace upper end 214 may also serve as this locking pin.

Preferably however, the pin 226 is engaged in one of the unoccupied locking holes in the trestle upper part. Alternatively, the pin 226 may engage in a hole specifically provided in the trestle upper or lower part, for fitment of the brace.

Figure 13:
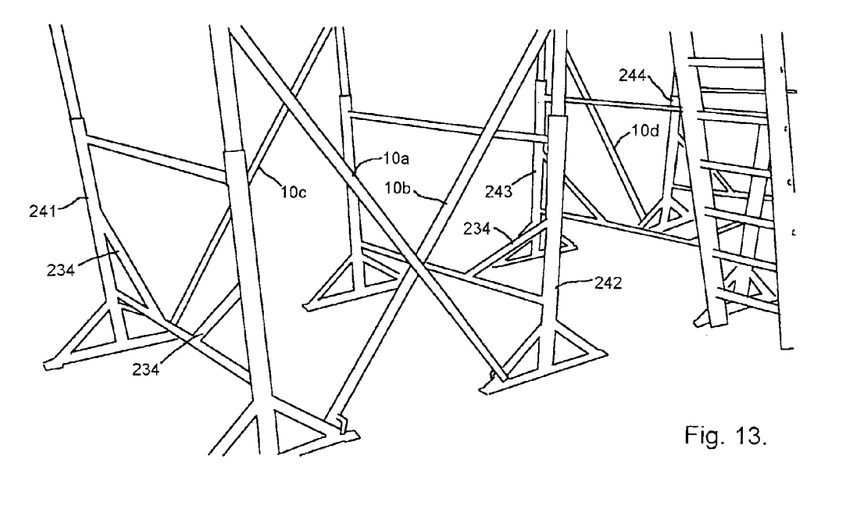
FIG. 13 is a general view showing braces locked in position between trestles.

FIG. 13 shows a line of trestles 241, 242, 243, 244 interconnected by braces embodying the invention. The braces 10a, 10b, 10c, 10d extend diagonally between adjacent trestles and cooperate with the scaffolding boards forming the working platform (not shown) to stabilise the trestles against swaying in the in-line direction. Each trestle also includes integrally welded diagonal braces 234 for added stability transversely of the working platform. Crossed braces 10a, 10b may be provided between adjacent trestles at one or both sides, or individual braces may be provided between selected neighbouring trestles in the line, according to need. The brace is therefore simple to use, adaptable, robust and reliable.

Figure 14:
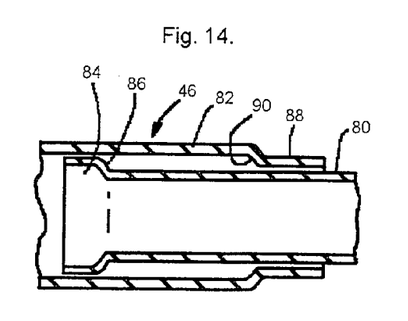
FIG. 14 is a cross-section through overlapping parts of a telescopic rail embodying the third aspect of the present invention.

A safety feature for securing inner 80 and outer 82 tubular parts of a telescopic rail 46 together to prevent the two parts from sliding free of one another is shown in FIG. 14. The inner end of the inner part 80 is flared to form an end stop collar 84 having a lateral outward projection 86. Correspondingly, the inner end 88 of the outer part 82 is formed of reduced cross-section to provide a lateral inward projection 90. The projections 86, 90 will abut one another to prevent the inner telescopic part 80 from being fully withdrawn from the outer telescopic part 82. As shown, the collar 84 and reduced end 88 are formed by plastically deforming ends of the parts 80, 82, e.g. by crimping, swaging or the like. The required deformation of the part inner ends 84, 88 may take place prior to attaching (e.g. welding) the end spigots to the outer end of each rail part 80, 82. The outer end of the inner part 80 is first fed through the outer end of the outer part 82 and out of the outer part inner end 88. The spigots are then attached, after any necessary flattening of the part outer ends.

Instead of being formed by plastic deformation of the rail parts, the lateral projections could originate on separate components, e.g. end stops/collars, which are later attached to the parts 80, 82 by welding or other suitable means. The lateral projections 86, 90, rather than being provided around the entire circumference of the part 80, 82 inner ends 84, 88, can instead be provided on only one, two or three corresponding faces of the parts 80, 82. Other (preferably non-circular) cross-sections for the parts 80, 82, besides the square or rectangular cross-sections shown, are also possible, with some or all of the part circumferences being provided with lateral projections.

Figure 15:
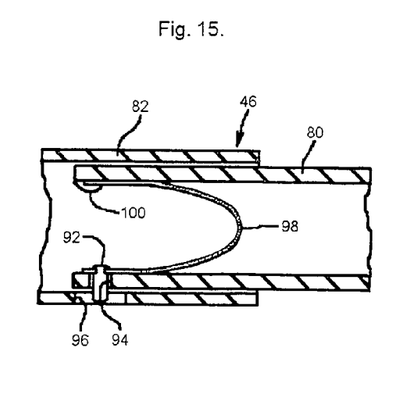
FIG. 15 is an alternative embodiment of the telescopic rail.
Figure 16:
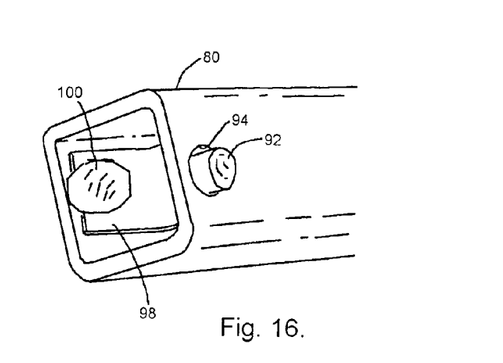
FIGS. 16 and 17 are perspective views of the inner telescopic part of the rail shown in FIG. 15.
Figure 17:
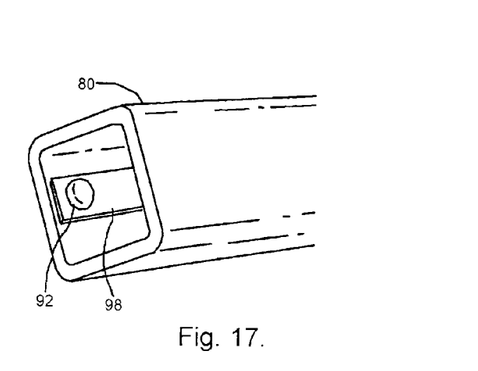

FIGS. 15 to 17 show an alternative embodiment of the rail safety feature. A resiliently loaded latch is formed by a pin 92 which projects from a hole 94 formed in the inner end of the inner telescopic part 80. The pin 94 may be pushed into the hole 94 against the resilient bias of a bowspring 98, by finger pressure applied through a slightly larger hole 96 formed in the inner end of the outer rail part 82. With the pin thus depressed, the inner part 80 may be slid further into the outer part 82 to adjust the length of the rail 46 as desired. When the part 80 is withdrawn from the part 82 again, as the pin 92 draws level with the hole 96, it will snap outwardly and engage in the hole 96 to prevent the two rail parts 80, 82 from sliding free of one another. The hole 96 therefore forms a locking formation for the latch pin 92. A similar hole may be provided towards the outer end of the outer part 82, so that the rail 46 may be latched in a fully retracted position. Indeed, corresponding intermediate holes may be provided, for latching the rail 46 at predetermined lengths, e.g. matching the recommended distance between adjacent trestles, or between the trestle upward extension 24 and the opposite removable upright 42. The bowspring 98 may be retained within the inner part 80 by welding or other appropriate fastening at 100. The pin 92 may be riveted through a hole 102 formed in the other end of the bowspring 98. Other forms of resiliently biased latch pin or other co-operating resiliently loaded latch and locking formations will be readily apparent.

Figure 18:
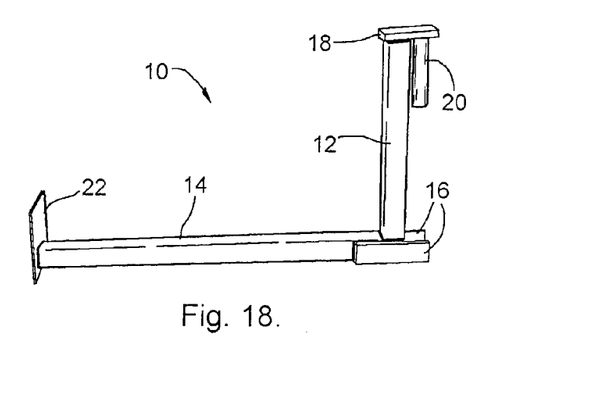
FIG. 18 is a perspective view of a ladder support bracket as described above.
Figure 19:
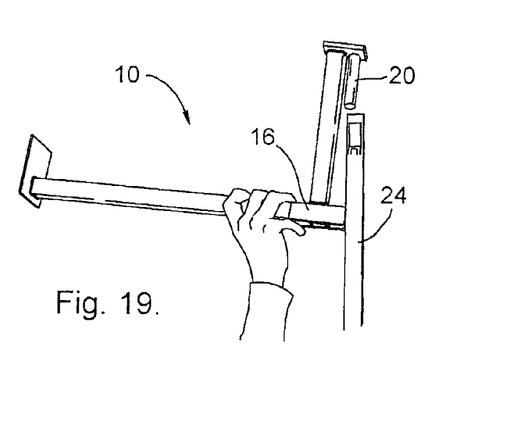
FIG. 19 shows the bracket of FIG. 18 being offered up for fitment to the upward extension of a trestle or scaffolding.
Figure 20:
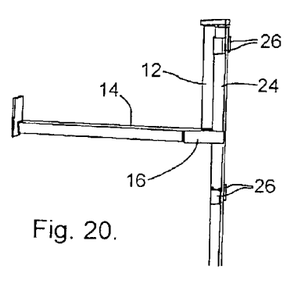
FIG. 20 shows the bracket of FIG. 18 fitted to the upward extension.

The ladder support bracket 10 shown in FIG. 18 comprises a generally vertical arm 12 and a laterally extending arm 14 each formed from square sectioned steel tubes each having one end welded to the other. A pair of reinforcing plates 16 is provided at the joint. The other (upper) end of the vertical arm 12 has a generally horizontal plate 18 welded to it. A spigot 20 depends from the plate 18 parallel to the arm 12 to provide a hook-like configuration. A plate 22 is welded to the free end of the lateral arm 14 to form an end stop. As shown in FIG. 19, the spigot can be fitted into the top end of a square sectioned tubular upright support 24 of a builder's trestle of the kind shown in GB2378978. Ends of the reinforcing plates 16 project outwardly below the spigot 20 to embrace the upright 24. The lower end of the arm 12 is thus steadied and the bracket 10 is prevented from rotating around the upright 24. In FIG. 20, the spigot is shown completely received within the hollow interior of the upright 24. Ears 26 for attachment of safety rails remain accessible with the bracket 10 in place.

Figure 21:
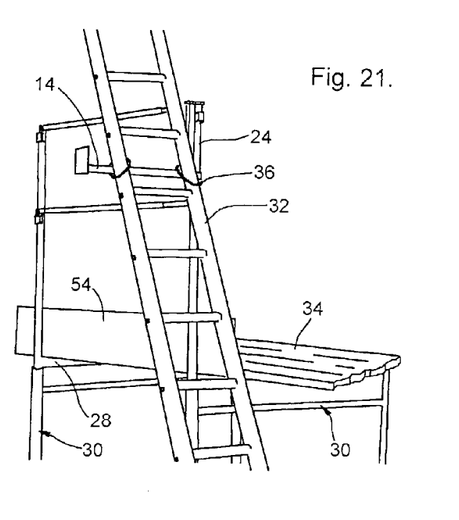
FIG. 21 shows the bracket of FIG. 18 in use supporting a ladder for access to a work platform supported on builders' trestles.

As shown in FIG. 21, the lateral arm 14 of the ladder support bracket extends in use generally parallel to the cross-members 28 of the trestles 30. In this position, the arm 14 can support a ladder 32 beside the working platform 34 resting on the trestles 30. The ladder 32 can be tied to the arm 14 as shown at 36. Only a small gap in the safety rail is required for workmen to step through between the ladder and the platform 34. This gap when not in use can be closed by safety rails located between the ears of adjacent uprights 24 in the usual way.

Figure 22:
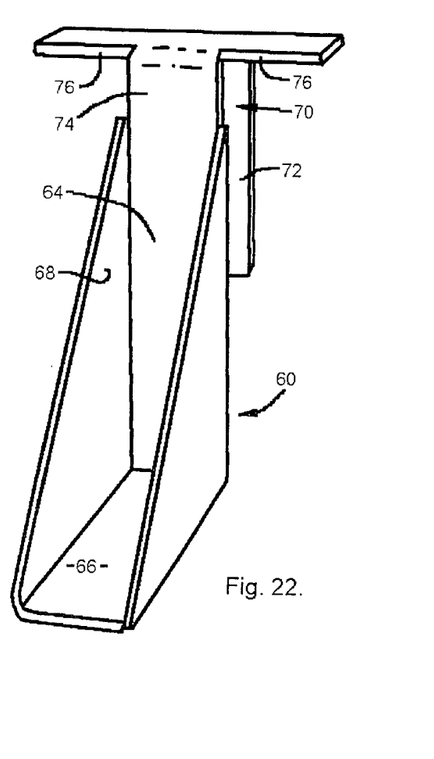
FIG. 22 shows a transverse kickboard bracket embodying the fifth aspect of the present invention.
Figure 22A:
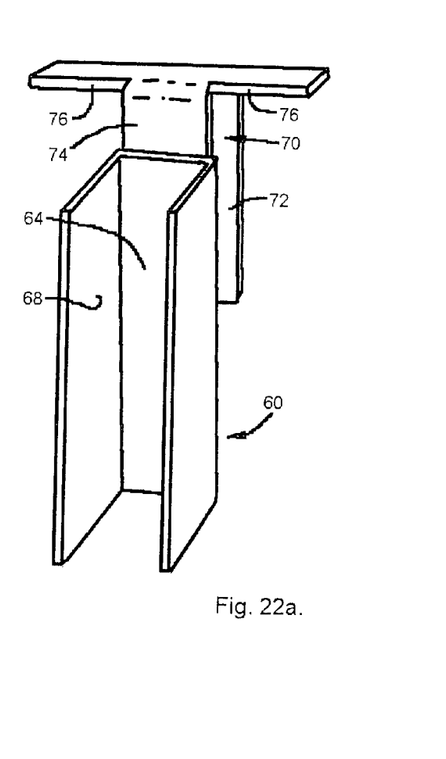
FIG. 22a shows a modification of the bracket of FIG. 22.
Figure 23:
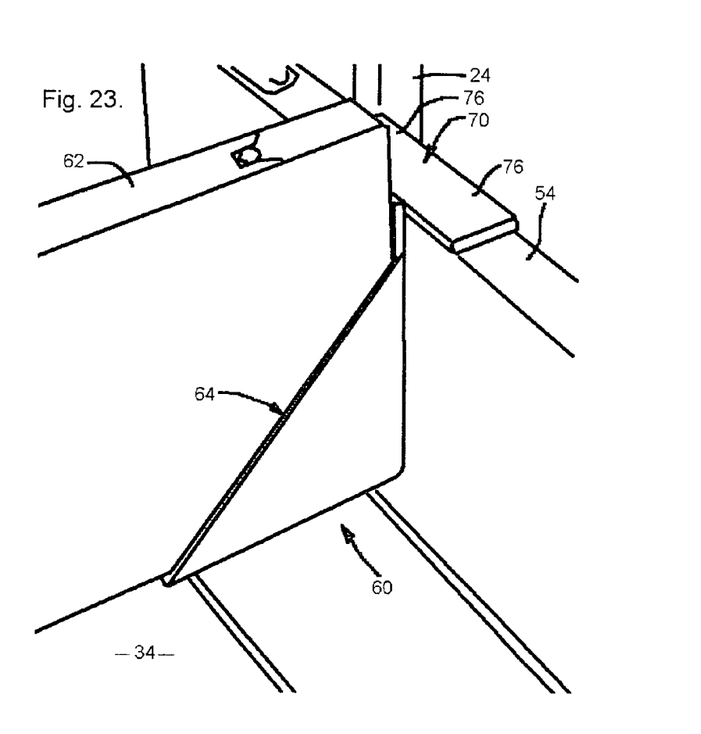
FIG. 23 shows the bracket of FIG. 22 in use.

FIGS. 22 and 23 show a bracket 60 for securing a transverse kickboard 62 to the longitudinal kickboard 54, for example to form a barrier to prevent objects from being accidentally knocked over the ends of the working platform 34. The bracket 60 comprises a socket 64 for receiving an end or corner of the transverse kickboard 62, the socket having a bottom wall 66 and an opposed pair of triangular sidewalls 68 spaced for snug reception of a standard scaffolding plank between them. The bracket 60 further comprises a clip 70 having a hook portion 72 extending parallel to a rear wall 74 of the socket 64, so that the clip 70 may be hooked over the longitudinal kickboard 54 whose upper edge is thus snugly received between the rear wall 74 and the hook portion 72. The clip 70 supports the socket 64 and thus the kickboard 62 from the kickboard 54 at a suitable height above the adjacent trestle crossmembers 28, allowing for the thickness of the platform 34. In the modification shown in FIG. 22a, the bottom wall 66 is omitted, so that the transverse kickboard is supported directly on the platform 34. This form of bracket may therefore be used with longitudinal kickboards of different heights (widths) or for support not only by longitudinal kickboards whose lower edge is substantially level with the platform 34 upper surface as in GB2378978, but also by longitudinal kickboards which lie outboard of the platform 34 and are supported on the trestle crossmembers as described below with reference to FIG. 24.

The clip 70 also comprises a pair of lateral extensions or projections 76, one projecting to either side of the socket 64. In use the extensions or projections 76 lie along the top edge of the longitudinal kickboard 54 and stabilize the bracket 60, preventing it from twisting about the longitudinal axis of the transverse kickboard 62. The transverse kickboard 62 is therefore stably and firmly secured to the longitudinal kickboard 54. If desired, the opposite end of the transverse kickboard 62, remote from the socket 64, can be braced against the endmost removable upright 42, to prevent the kickboard 62 from tending to swing outwardly of the platform 34 about the bracket 60. The transverse kickboard 62 may even be clamped or otherwise secured to the removable upright 42.

Figure 24:
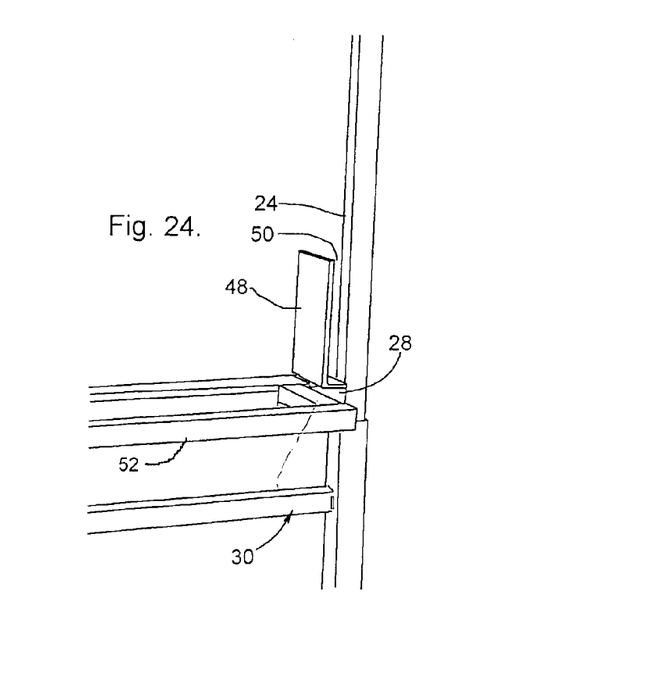
FIG. 24 shows a crossmember kickboard bracket referred to above.

In FIG. 24 there is shown a kickboard bracket in the form of an angle having a horizontal limb welded to the trestle upper crossmember 28. A generally upright limb 48 of the bracket lies just inboard of the trestle support fixed upward extension 24, to define a board-receiving slot 50. The limb 48 is spaced a sufficient distance from the tubular socket 38 (FIG. 5) to allow fitment of a board overhanging end supporting bracket 52 to the crossmember 28, if required. A longitudinal kickboard 54 can be seen in FIG. 21, supported on the crossmembers 28 of a pair of adjacent trestles 30. The kickboard 54 is retained in the slots 50 between the upright limbs 48 and the adjacent upward extensions 24. A platform 34 is formed from scaffolding boards supported on the crossmembers 28 between the limbs 48 and sockets 38.

The invention claimed is:

1. A ladder support system which includes: a builders' trestle or scaffolding having a generally vertically extending upright support; and a ladder support bracket which comprises:

a laterally extending arm against which a ladder can be rested in use; and a generally vertically extending arm which is adapted to engage the upright support;

wherein the generally vertically extending arm comprises a downwardly directed spigot which is adapted to be received in a hollow interior of a top end of the upright support such that the generally vertically extending arm lies alongside and against the generally vertically extending upright support.

2. A ladder support system as defined in claim 1, wherein the generally vertically extending arm is hollow.

3. A ladder support system as defined in claim 1, wherein the generally vertically extending arm is provided with an outward projection which is configured to engage the upright support to prevent rotation of the ladder support bracket around the longitudinal axis of the upright support.

4. A ladder support system as defined in claim 3, wherein the outward projection comprises a non-circular profile which is complementary to the cross-section of the upright support.

5. A ladder support system as defined in claim 1, wherein the laterally extending arm comprises a first end which is attached to the generally vertically extending arm and a sedond end which comprises a stop member.

* * * * *